United States Patent [19]

Schad

[11] 4,444,711
[45] Apr. 24, 1984

[54] METHOD OF OPERATING A TWO-SHOT INJECTION-MOLDING MACHINE

[75] Inventor: Robert D. Schad, Toronto, Canada

[73] Assignee: Husky Injection Molding Systems Ltd., Bolton, Canada

[21] Appl. No.: 333,426

[22] Filed: Dec. 21, 1981

[51] Int. Cl.³ .................. B29F 1/14; B29C 5/08
[52] U.S. Cl. .................. 264/243; 264/255; 264/334
[58] Field of Search ............. 264/243, 255, 334, 250; 425/805, 576; 15/186, 187, 188

[56] References Cited

U.S. PATENT DOCUMENTS

| | | | |
|---|---|---|---|
| 1,563,529 | 12/1925 | Satterlee | 264/334 |
| 2,592,296 | 4/1952 | Kutik | 300/21 X |
| 2,783,490 | 3/1957 | Kutik | 15/187 |
| 3,004,291 | 10/1961 | Schad | 425/443 |
| 3,098,262 | 7/1963 | Wisotzky | 425/805 |
| 3,128,488 | 4/1964 | Schad | 425/805 |
| 3,317,644 | 5/1967 | Takai | 15/187 |
| 3,454,991 | 7/1969 | Rees | 425/169 |
| 4,243,362 | 1/1981 | Rees et al. | 425/130 |
| 4,244,076 | 1/1981 | Meyer | 264/255 |

*Primary Examiner*—Willard E. Hoag
*Attorney, Agent, or Firm*—Karl F. Ross

[57] ABSTRACT

There is disclosed a method of operating an injection-molding machine to produce a composite item that includes a portion of soft material such as a set of bristles tending to cling to a mold cavity in which it is formed. At a first station, a relatively flexible plastic material is injected into a first cavity shaped to define the portion of soft material of the composite item, that portion including a backing layer. The portion of soft material is then allowed to cool, and at a subsequent station there is injected a relatively rigid plastic material into a second cavity bounded by the backing layer. The second cavity defines a harder portion of the composite item such as a brush handle. After the latter portion has also cooled, the portion of soft material is separated from the first cavity by pulling on the harder portion at a rate of speed slow enough to avoid rupture of the portion of soft material.

18 Claims, 12 Drawing Figures

METHOD OF OPERATING A TWO-SHOT INJECTION-MOLDING MACHINE

FIELD OF THE INVENTION

My present invention relates to a method of operating an injection-molding machine of the two-shot type for molding composite articles partly consisting of a soft plastic material which tends to cling to a mold cavity wherein the article is formed. Nonlimiting examples of such articles are brushes which have molded fine bristles of such rubbery or soft material.

BACKGROUND OF THIS INVENTION

Plastic brushes of the kind for which this invention has a particular advantage consist essentially of two elements: the bristles and the handle. At the present time, such brushes are produced in conventional injection molds as integral units, the molds including a multicell bristle cavity and an adjoining handle cavity.

During injection, the plastic material (typically polyethylene) fills the bristle cavity and the handle cavity. When the mold is opened, the bristles which are attached to the handle are pulled out of their cavities by the handle which is held in its cavity by undercuts or by side cores. Once the bristles have been released from these cavity cells, the brush is ejected from the handle cavity.

The cells of the bristle cavity can be formed by simple blocks, taper-drilled for the shape of the bristles, or composite blocks, consisting of a pack of interfitting blades into which bristle-shaped grooves are machined. The bristle shape is typically triangular in cross-section and tapers toward the tip. These blade packs can be fixed or relatively slidable, as described in my earlier U.S. Pat. Nos. 3,004,291 and 3,128,488.

Another method of making such bristle-molding cells utilizes cavity blocks with a multitude of round pins inserted into them. Each pin has a plurality of axially oriented grooves in its circumference, typically of triangular shape, whereby several bristles are formed by each pin.

Regardless of the bristle-cavity construction which is used, it will be readily understood that the cooling of the bristles gives rise to problems relating to the length of time required. Because the bristles of an ordinary brush are spaced very close to one another, it is virtually impossible to provide cooling channels where they are most needed, namely right next to the bristles. The only practical way to provide any cooling is to locate the channels around the cavity blocks and in the backing plate. This construction results in an inefficient and therefore slow cooling of the bristles. In fact, cooling cycles last ½ to 1½ minutes, depending upon the length and thickness of the bristles.

A serious drawback with the brushes produced from polyethylene is the fact that, even with very fine bristles, they do not generate the kind of lather required for such uses as "scrubbing" by medical personnel.

A relatively new molding material, known commercially as "Kraton" (trademark), is a modified rubber that can be processed in conventional injection-molding equipment. As used hereinafter, the term "modified rubber" is intended to mean a material substantially the same as is available under the name of Kraton. This material is more expensive than polyethylene, yet the brushes produced with it make an excellent lather. Because Kraton is very "rubbery" (elastic and flexible) it is an excellent material for the bristles of the brush, but this same characteristic makes it almost impossible to mold Kraton with the previously described methods of ejection. In other words, if Kraton were used to make an integral brush in which undercuts or side cores in the handle served to pull on the handle and thus release the bristles from the cells of their cavity, the "stickiness" of the bristles against the small-bore cells would cause them to remain stuck and literally pull the handle out of its own cavity, even if it were strongly engaged by undercuts or side cores. The Kraton simply stretches and slips out uncontrollably, leaving the bristles of the brush in associated elongate mold cells.

This difficulty can be overcome by attaching a rigid backing to the base of the bristles, either by fastening or by molding, which can be used to pull the bristles out of their cells in a controlled manner.

It should be noted that the above remarks are not limited to Kraton or to brushes, but can be applied to any soft, rubbery material and for any product which is difficult to remove automatically from the cavities by conventional methods.

OBJECT OF THE INVENTION

In view of the foregoing considerations, it is the object of my invention to provide a method of so operating a machine for molding plastic brushes and the like that flexible and "sticky" material such as Kraton may be used for the bristles of a brush while the problem of effectively releasing the bristles from their cavities is overcome.

SUMMARY OF THE INVENTION

My improved method of operating a two-shot injection-molding machine to produce a composite article such as a plastic brush includes several steps. There are provided in the machine a plurality of stations at which operations can be carried out. At a first station, a relatively flexible first plastic material is injected into a first cavity with cells shaped to define a first workpiece section, specifically the bristles of the brush, and with an adjoining clearance conforming to a relatively thin backing layer therefor. At a second station the bristles and their backing layer are allowed to cool. At a third station a relatively rigid second plastic material is injected into a second cavity bounded in part by the backing layer, this cavity conforming to a second workpiece section, specifically a handle portion for the brush. The handle portion is allowed to cool, and then the bristles are separated from the first cavity by gradually pulling on the handle portion at a controlled rate slow enough to avoid rupture of the bristles and to maintain the coherence of the resulting workpiece.

A two-part injection-molding machine particularly suitable for the practice of my invention includes a turret with four orthogonally adjoining operational faces adapted to be sequentially rotated through four angular positions in steps of 90°, the turret including a primary mold portion on each face defining part of a first cavity with a multiplicity of cells for the molding of the bristles of the brush. At the aforementioned first station this first cavity is completed by a secondary mold portion juxtaposed with the primary mold portions to provide space for a relatively thin backing layer to be molded integral with the bristles, that station also having means for injecting the relatively flexible first plastic material into the first cavity to form the bristles and the backing layer. At the second station a major surface of the backing layer is exposed to the atmosphere. A tertiary mold portion juxtaposed with the primary mold portion at the third station forms a second cavity bounded by the backing layer, the latter cavity conforming to a handle portion for the brush; this station also has means for injecting the relatively rigid plastic material into the second cavity to produce the handle. The handle, after cooling, is pulled away from the turret face at the third or at a fourth station for separating the bristles from the first cavity at the controlled rate referred to, advantageously after a partial detachment of the bristles from their cell walls by a limited separation of two members jointly defining the cells of the first cavity.

BRIEF DESCRIPTION OF THE DRAWING

The above and other features of my invention will now be described in detail with reference to the accompanying drawing in which.

DETAILED DESCRIPTION

In my early experiments with Kraton, a fairly heavy backing in the shape of a band was molded integral with the bristles. The mold was then opened whereupon the bristles were gradually extracted from their cavity cells manually by pulling slowly on the band. Because of the thickness of the band, it had a rather stiff structure and thus could act as a relatively solid base for successively pulling the bristles out by hand. Mold-release spray was found to help the disengagement of the bristles, but the use of the spray added more time to an already slow operation. Furthermore, a major disadvantage of using mold-release sprays is the danger of contamination, particularly for brushes which are to be used in surgical applications.

Because of the thickness of the band just mentioned, on the order of 3 mm, the band not only added a considerable amount of weight to the workpiece but also was very slow in cooling. It will be evident that the heavy weight of the band, the slow cooling cycle and the slow method of removal would have made for an expensive artidle if this line of development had been pursued.

Figure 1A:
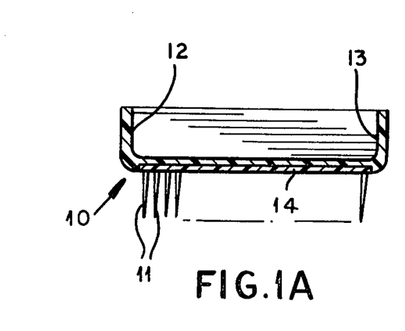
FIGS. 1A and 1B respectively show an elevation and an end view of a composite brush molded in accordance with the method of this invention.

In lieu of the integral brush structure just mentioned, the method according to my invention is adapted to produce a two-material brush of the kind shown in FIGS. 1A–4. In FIGS. 1A and 1B a brush 10 is seen to include a multiplicity of bristles 11, of Kraton or comparable flexible material, and a handle 12 made of any fairly stiff, compatible and low-cost material such as polyethylene. Polyethylene is quite suitable for this application because it is capable of bonding with the Kraton under heat and pressure from the injection. If other materials are to be used, they may require a bonding agent.

Figures 1B, 2B, 3, 4:
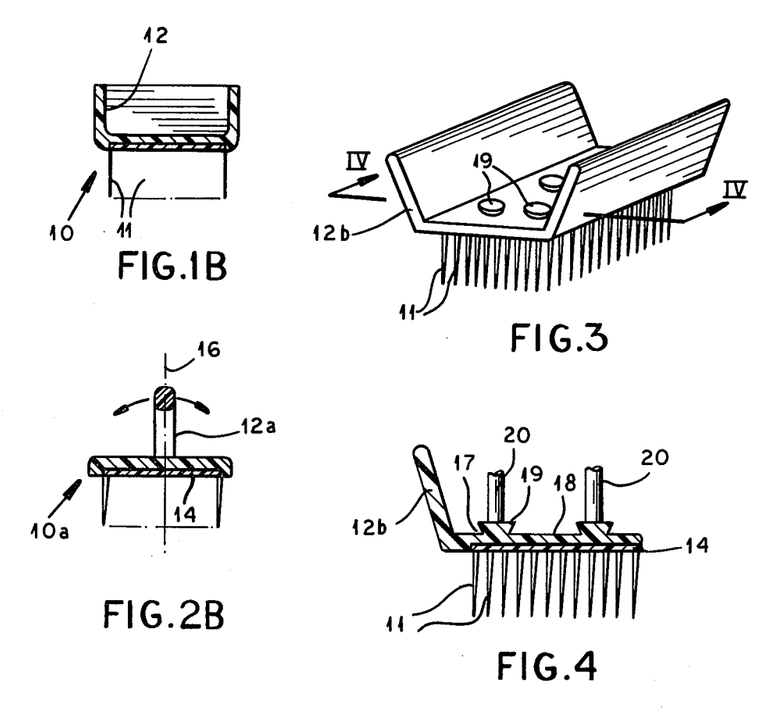
FIGS. 2A and 2B respectively show an elevation and an end view of a different brush molded in accordance with this method.
FIG. 3 is a perspective view of a third form of brush molded in accordance with my invention.
FIG. 4 is a fragmentary cross-sectional view taken on the line 4—4 of FIG. 3.

It will be noted that the handle of the brush shown in FIGS. 1A and 1B is shaped like an upwardly open box with a slight undercut 13 around the inside edge or lip. This undercut allows the handle 12 to remain in gripping contact with the mold portions defining the cavity in which it is formed, so that retraction of those mold portions will pull on the handle 12 and thus also on the bristles 11. Once the bristles are removed from the cells of their cavity, the handle 12 can be separated from the corresponding mold part with the aid of standard ejector pins.

Figure 2A:
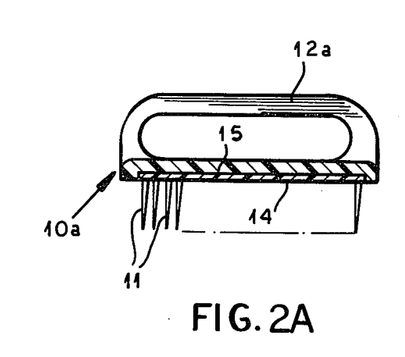

In FIGS. 2A and 2B a similar brush 10a is shown wherein, however, the handle 12a is essentially in the form of a closed loop extending upward at right angles to a backing layer 14 adjoining the bristles 11. The handle 12a also includes a relatively stiff plate portion 15 bonded to the backing layer 14. The mold parts defining the handle cavity may separate along the parting line 16, or else side cores withdraw after the bristles have been pulled out of their cells and the mold parts can then fall out. As an alternative, the bristles may stay in their cells and then in the next station be slowly extracted by the action of a take-off member gripping the handle.

FIGS. 3 and 4 show another way of retaining a brush handle in its cavity in cases where the construction shown in the preceding Figures cannot be used. Undercuts 17 in the flat portion 18 of the handle 12b are defined by small "buttons" or bosses 19 which create a dovetail effect and assure that enough force is available to pull the bristles out of their cavity cells. Ejector pins 20 aligned with the buttons 19 are then used to discharge the finished brush.

The molds of FIGS. 5–8, now to be discussed in detail, include bristle-cavity cells formed by sliding blades as disclosed in my above-identified prior U.S. Pat. Nos. 3,004,291 and 3,128,488. However, non-separating unitary cavity structures would operate similarly and would not require the hydraulic plate-separation mechanism and controls within a turret which will be described hereinafter.

For the practice of my novel method, a machine such as that disclosed in U.S. Pat. No. 3,454,991 may be used. Generally, I may utilize any molding machine equipped with two injection systems and a transfer mechanism to carry the unfinished parts (bristles) from a first to a second injection station where the handle can be molded onto them. The preferred machine operable according to this method comprises a four-station turret as disclosed in U.S. Pat. No. 4,330,257.

Figure 5:
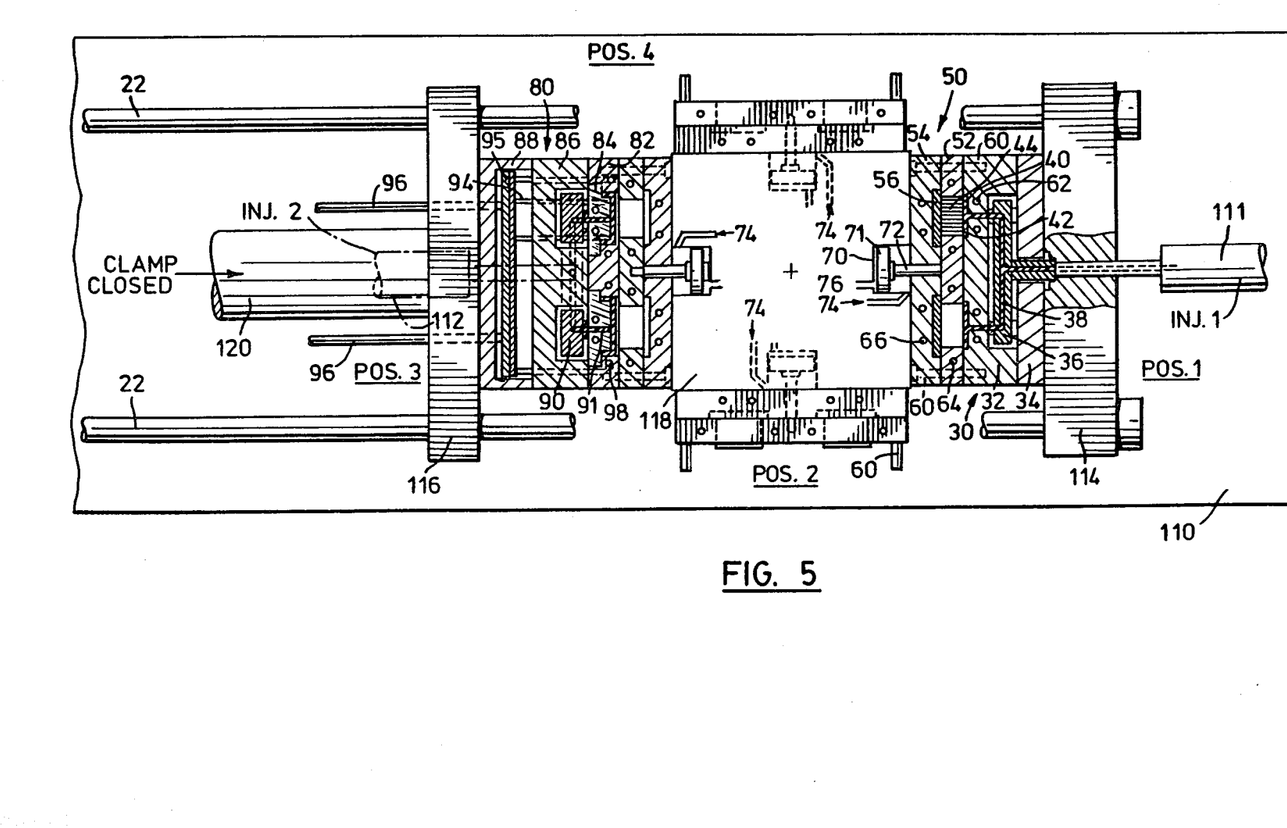
FIGS. 5 and 6 are plan views of the significant components of a molding machine shown in two sequential stage of operation in accordance with this invention.
Figure 6:
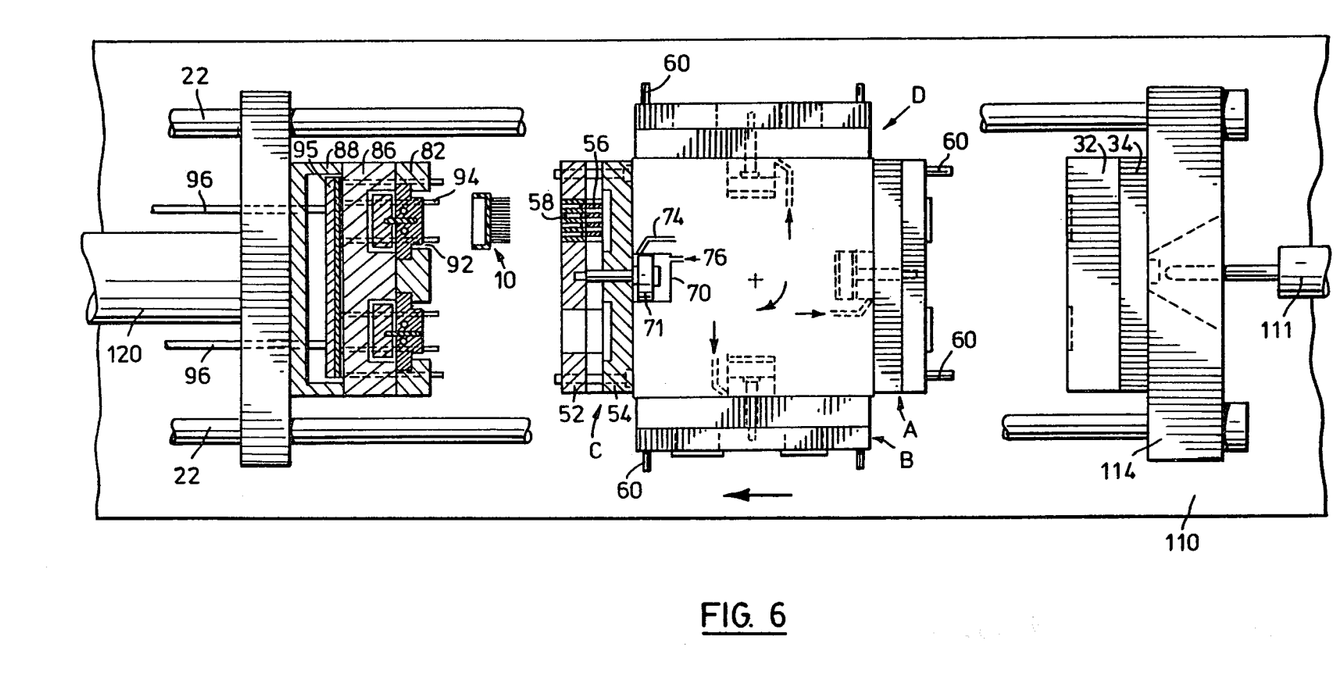
Figure 9:
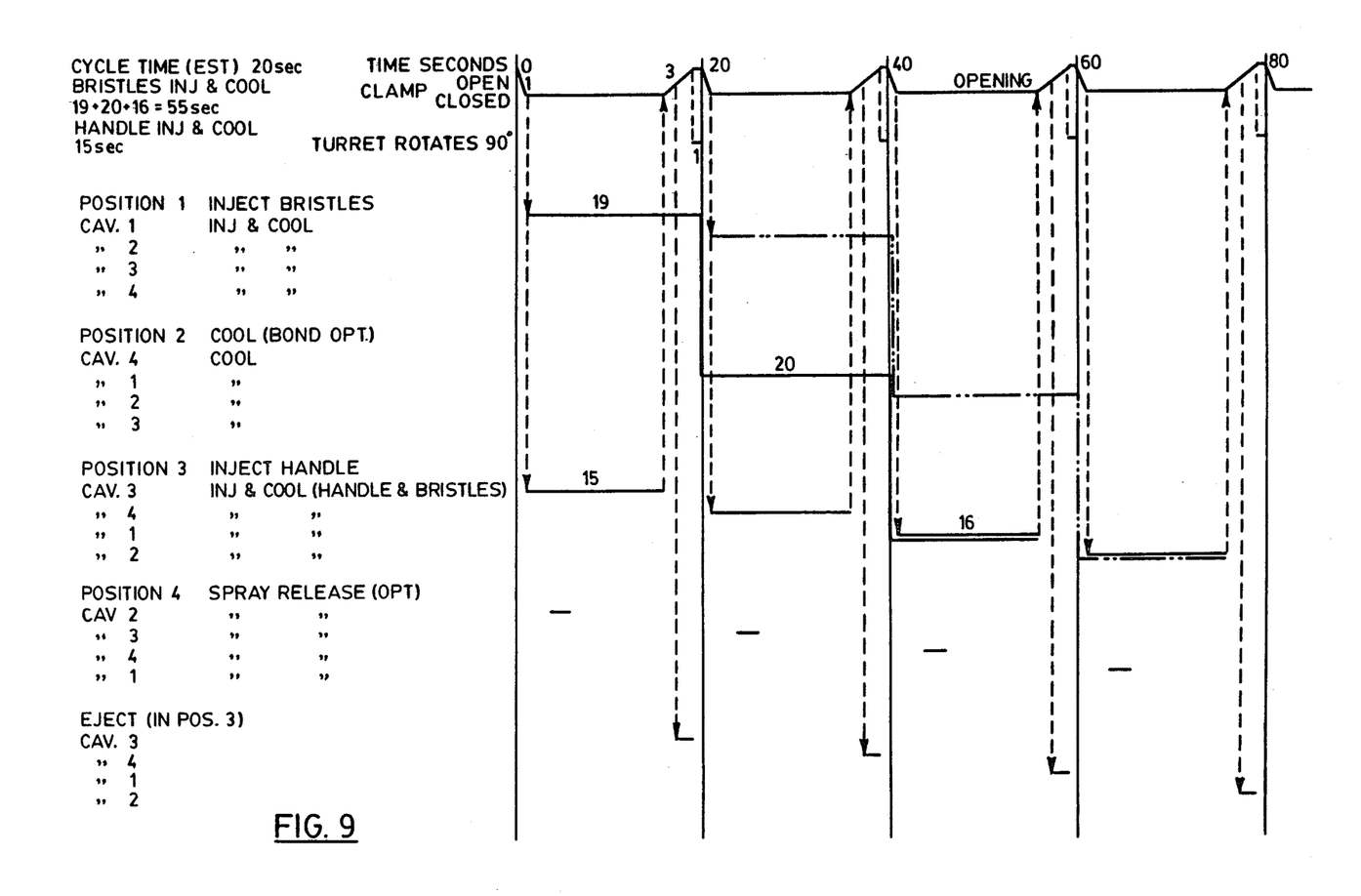
FIG. 9 is a timing diagram pertaining to the operation of the machine of FIGS. 5 and 6.

Attention is first directed to FIGS. 5 and 6, to be viewed in conjunction with the timing diagram shown in FIG. 9.

In FIGS. 5 and 6, a base 110 represents a two-shot molding machine equipped with two injection systems 111 and 112, as described in U.S. Pat. Nos. 4,243,362 and 4,330,257. This machine has a clamping system consisting of a stationary platen 114, a moving platen 116 and a turret 118. A clamp column 120 drives the platen 116 to open or close the molds. The turret 118, supported in a nonillustrated manner on the base 110 and guided on tie bars 22, is moved in the direction of the clamp column 120—but at a slower speed—by a mechanism which is not shown. The latter motion is sufficient to permit rotation of the turret 118 during mold-open time, without interfering with the mold portions on the stationary and moving platens. The open position is illustrated in FIG. 6. This machine will be seen to produce brushes 10 as described above with reference to FIGS. 1A and 1B.

The stationary platen 114 carries a fixed mold half 30 consisting of a cavity plate 32 and a backing plate 34, with a hot-runner system 36 supported therebetween in minimal contact with members 32 and 34. The hot-runner system supplies plastic through heated ducts 38 from the injection unit 111 to a cavity structure 40 defining a relatively narrow, flat clearance 42 in mold half 30 which forms the thin common backing layer 14 of the preceding Figures, and which faces elongate bristle-forming cells 44 that are part of a core section 50 on a confronting face of turret 118. There are four identical core sections 50, one for each of the four sides of the turret. Each such core section 50 consists of a front plate 52, a backing plate 54, and for each hot-runner branch a blade pack which defines the elongate cavity cells 44. Each blade pack consists of one set of blades 56 anchored in the backing plate 54 and a matching set of interfitting blades 58 held in front plate 52 (best seen in FIG. 6).

Guide pins 60 slidably connect the front plates 52 with the associated backing plates 54 and line up the core sections 50 with the mold half 30 on the stationary platen 114 and with another mold half 80 on the moving platen 116. Core sections 50 and mold halves 30, 80 respectively constitute the primary, secondary and tertiary mold portions referred to above.

Water-cooling channels 62, 64 and 66 are shown in plates 32, 52 and 54, respectively. All water channels in the mold sections 50 mounted on the turret are fed from a central supply through the shaft of the turret (not shown).

Hydraulic cylinders 70 in the turret are located under each core section 50, and a piston rod 72 is mounted on each plate 52 so that, when the cylinder 70 is pressurized at a port 74, the plate 52 is pulled against the plate 54. Conversely, when the cylinder 70 is pressurized at a port 76, the plate 52 is pushed forward, thus withdrawing the blades 56 from the blades 58 and thereby releasing the molded bristles, as disclosed in U.S. Pat. No. 3,004,291.

The handle-forming mold half 80 mounted on the moving platen 116 consists of a cavity plate 82, cavity inserts 84 serving as handle-gripping formations, a hot-runner intermediate plate 86 and a backing plate 88.

A hot-runner block 90 is supported with minimum contact between plates 82 and 86. Plastic is ducted through channels 91 from the injection system 112 to cavities 92 (see FIG. 6).

Ejector pins 94 are carried on a shiftable plate 95 and pass through plates 86, 88 and 82. The plate 95 is actuated by the ejection system of the molding machine, not further illustrated, through pins 96. The plate 82 and cavity inserts 84 are water-cooled through appropriate channels 98.

The operation of the machine of FIGS. 5 and 6 is now to be described; reference may simultaneously be had to the timing diagram of FIG. 9.

As the mold closes, the bristles and their thin backing layer are molded in cavity structure 40, in position 1 (to the right in FIG. 5), from a relatively flexible plastic introduced from the injection unit 111 through channel 38.

As the mold opens (FIG. 6) the bristles with their backing layer remain in the core section or primary mold portion A. The turret now turns through 90° in a clockwise direction, as viewed in the drawing, and the just-molded bristles move into position 2 (down in FIGS. 5 and 6). The bristles which had previously been molded and held in core section B now move into position 3 (to the left in FIGS. 5 and 6), thus facing the tertiary mold portion 80. The mold now recloses, and the previously empty core section D now faces the secondary mold portion 30 for filling with plastic from injection unit 111.

Injections from units 111 and 112 now take place simultaneously. In position 1 a new bristle portion is molded, and in position 3 the handle is molded onto the previously molded bristles which are still held in their cavity cells for continuing cooling.

As soon as the handle is ready for ejection (in the timing diagram of FIG. 9 this is tentatively indicated as 15 seconds), the mold opens. It is now very important that this opening stroke proceed very slowly in the first phase of the platen motion. The hydraulic cylinder 70 is pressurized as soon as the mold opens so that plate 52 follows the receding mold half 80. Blades 56 slide out from between the blades 58 interleaved therewith to release the bristles. It should be noted that even though the bristles have now ample space to withdraw, their plastic material is very sticky and tends to cling to the blades 58 of the outer plate 52. In order to give the bristles time to detach themselves slowly from the latter blades, the pulling-out motion must be very gradual; otherwise the bristles can tear and remain stuck in their cells.

The slow opening is indicated in the timing diagram of FIG. 9 by allowing 3 seconds rather than the normally required 1 second for the opening stroke. As soon as the mold is opened far enough, the machine ejectors 96 are activated and push the sliding plate 95 forward so that the pins 94 dislodge the finished brushes from the cavities. By reversing the force on piston 71, the plate 52 is returned to sit again on plate 54. The turret now turns through another 90° in a clockwise direction, as seen in the drawing, whereupon the empty core section C is in position 4, either simply waiting or (if permissible) being sprayed from an automatic mold-release dispenser (not shown) which is in common usage and commercially available.

It can be readily seen that, with the sequence described above, the bristles remain in their cavities more than three times the term allowed for the injection of the handle, during which period they are subjected to cooling by the fluid circulating through channels 64 and 66.

The diagram shown in FIG. 9 illustrates by way of example an assumed time sequence with the injection and cooling time for the handle taken to be 15 seconds. The diagram also assumes closing, turning and opening times of 1, 1 and 3 seconds, respectively. The time during which the bristles are subjected to cooling is almost four times as long as the injection and cooling time for the handle.

It is to be noted that the intervals shown in the timing diagram of FIG. 9 are merely assumed and could be more or less, depending on product design and mold construction. However, the diagram makes it clear that the time during which the bristles are exposed to cooling is 3 to 4 times as long as the molding cycle which is limited by the injection and cooling time of the handle.

Figure 7:
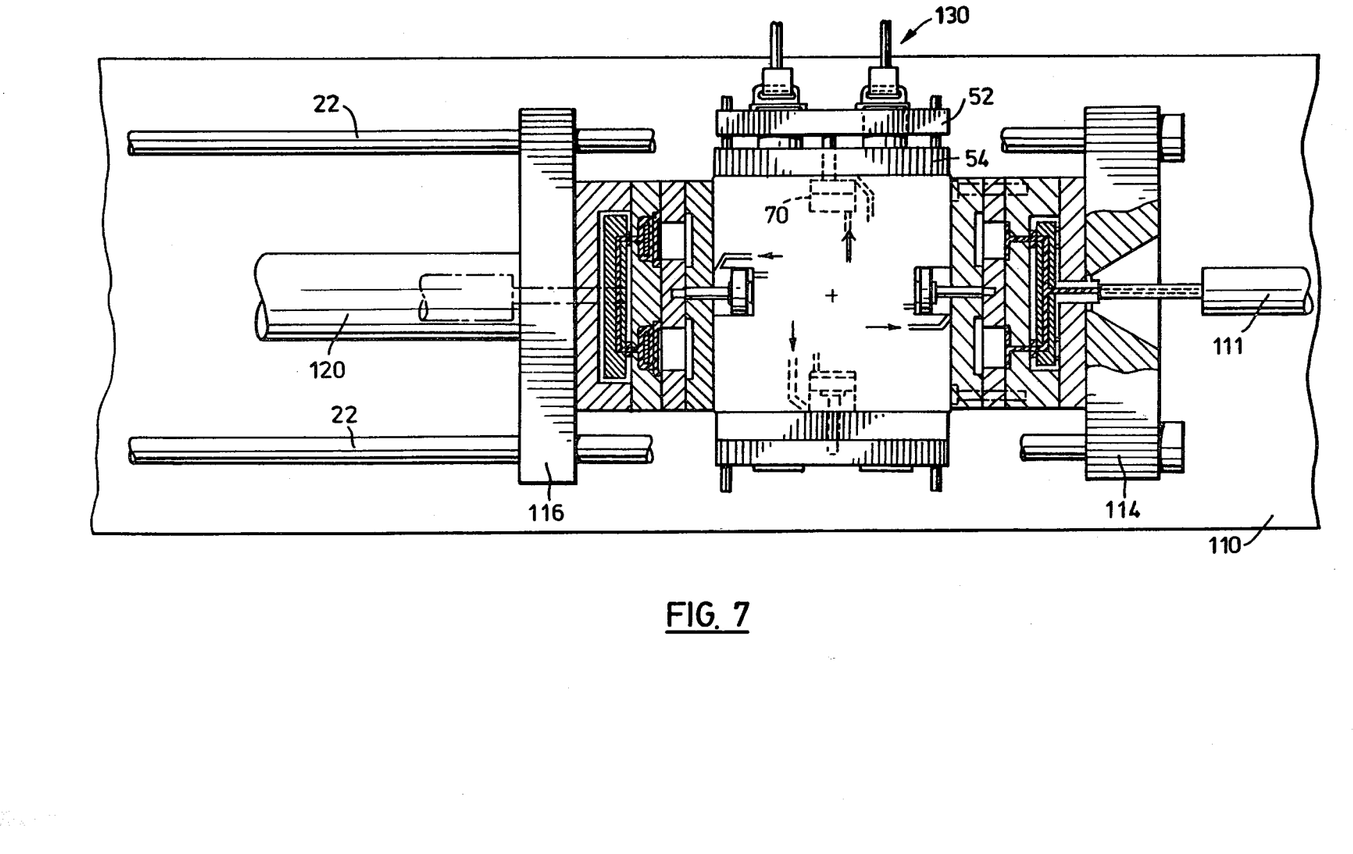
FIGS. 7 and 8 are similar to FIGS. 5 and 6, showing a modification of the molding machine operated according to this invention.
Figure 8:
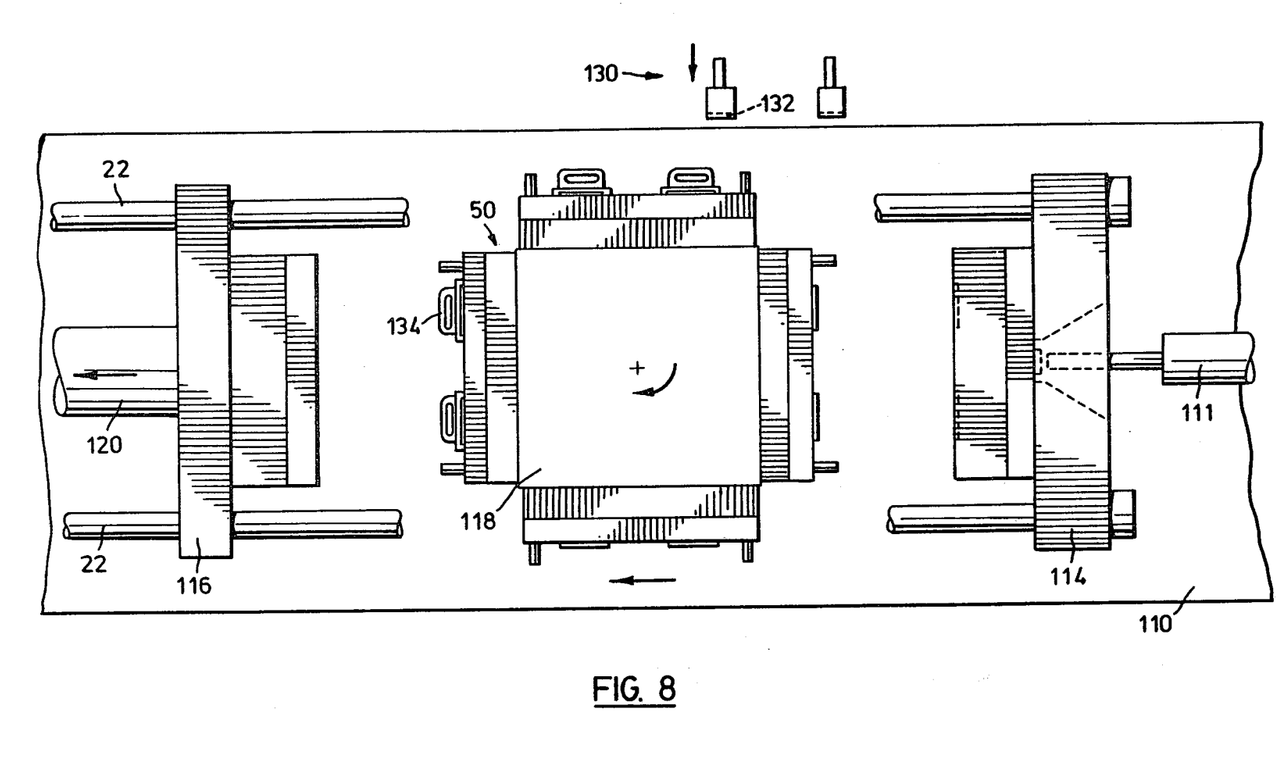
Figure 10:
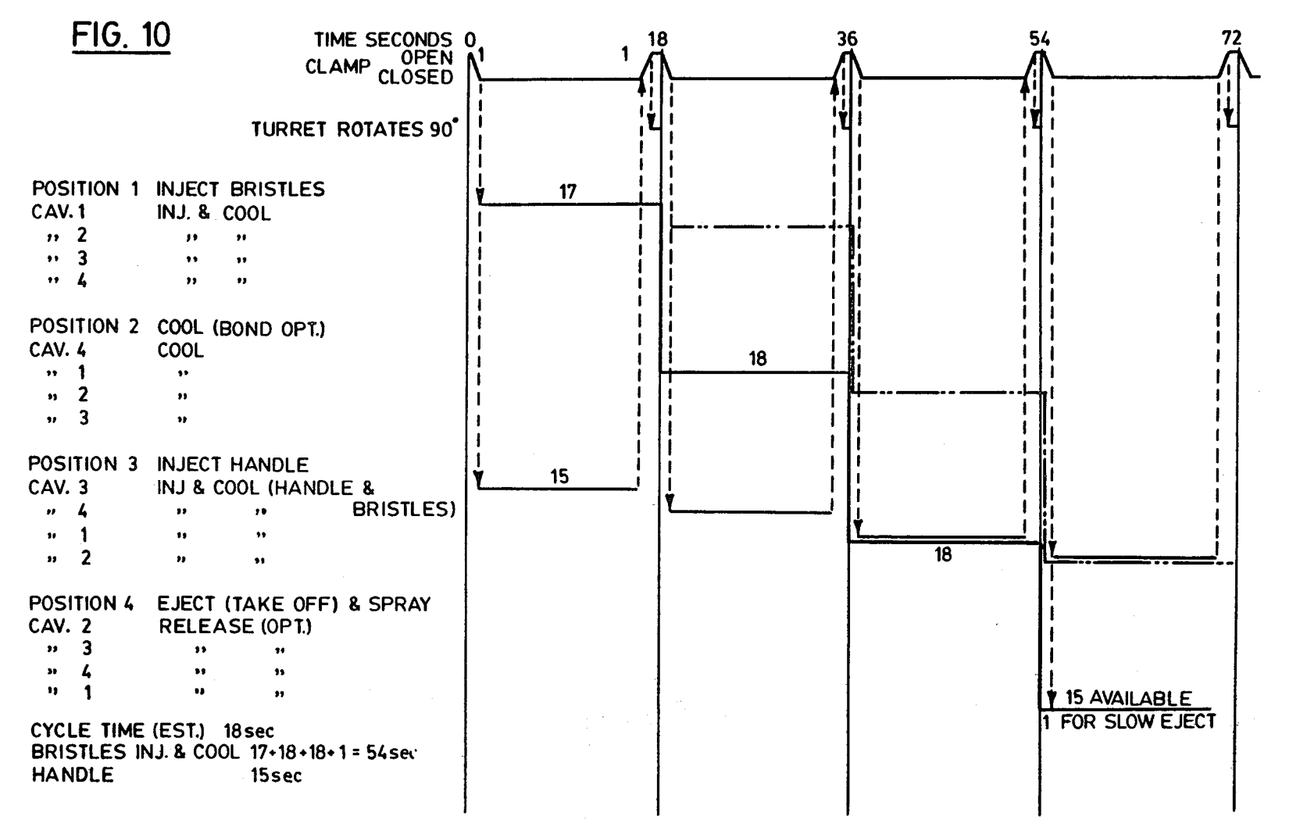
FIG. 10 is a timing diagram pertaining to the opteration of FIGS. 7 and 8.

A different and advantageous sequence is illustrated in FIGS. 7 and 8 and attention is now directed to these Figures along with the timing diagram shown in FIG. 10.

In the machine shown in FIGS. 7 and 8, the mold structure and the method of injection are substantially the same as those described with reference to FIGS. 5 and 6 except that the brushes to be produced are of the type shown at 10a in FIGS. 2A and 2B. Also, position 3 adjacent platen 116 is used only to inject the handle onto the bristles, and not to withdraw the bristles from their cavity cells. The extraction of the bristles takes place at a fourth station occupied in position 4 (up in FIGS. 7 and 8). At that station, a take-off mechanism 130 is withdrawable to a waiting position (shown in FIG. 8) in which it is far enough back so as not to impede the rotation of the turret 118. As the mold opens after cooling of the handle in position 3, each newly formed handle stays with the bristles on the core section 50. The turret now turns through 90° in the clockwise direction, as seen in the drawing, and the clamp recloses for the next cycle. The brushes last produced now face the take-off mechanism 130, which advances and engages the loop-shaped handles with suitable gripping formations constituted by claws 132 that merely project at right angles from their supports and constitute retractors designed to pass into the openings 134 of the loops. Of course, many other engagement and retractor designs could be utilized.

The cylinder 70 is now pressurized very slowly to separate the plates 52 and 54 at a gradual pace, thereby slowly freeing the bristles from their cells. The retractor assembly constituting the take-off device 130 is so controlled that the initial motion is very slow for the first 10 mm or so, before the retraction is accelerated to deliver the brushes to their drop-off point. Thereafter, the mechanism 130 returns to the waiting position shown in FIG. 8.

Two main advantages become evident when comparing the sequence shown in FIGS. 7 and 8 with that described with respect to FIGS. 5 and 6. Firstly, the separation of the platens can take place at full speed, as is illustrated in the timing diagram of FIG. 10, by allowing only 1 second for the opening. Assuming the same injection and cooling time for the handle as previously (15 seconds), the total cycle is now reduced from 20 to 18 seconds, almost without affecting the time allowed for the bristles to cool (54 seconds instead of 55 seconds), or almost four times the injection and cooling time of the handle.

Secondly, a good portion of the 15 seconds during which the mold is closed is now available for the withdrawal of the bristles. Assuming times for the action of the take-off device (in-grab-out-release-reset) of about 8 seconds, there are still 7 seconds available for the slow pull-out of bristles over the first few millimeters. This advantage would be even greater if the time required for slow withdrawal in the sequence of FIG. 9 were more than 3 seconds.

It is again stressed that the times shown are given only by way of illustration and could be more or less, according to part design and mold construction. However, in essence the cooling time of the bristles is three to four times the injection and cooling time of the handle.

It will be appreciated that the molding machine shown could include an attachment making it possible to apply a bonding material to the thin backing layer in position 2, in such cases where the material of the handle is not readily bonded by heat and pressure to the bristle material. Such setup would add to the cost of the installation, but would not affect the molding cycle. Conversely, the exposed major surface of the backing layer could be provided with protuberances having undercuts around which the plastic material of the handle would harden, thereby providing a mechanical bonding between the bristles and the handle in cases where the two materials do not automatically adhere to each other.

My invention is also applicable to the production of a pre-soaked disposable brush. It will be readily appreciated that, after ejection of the brush in either station 3 or station 4, a jet of liquid or powdered soap can be directed into the bristle cavities at station 4, in a manner similar to the conventional mold-release-spraying method. The soap will adhere lightly to the walls of the cavities and will not impede the filling thereof during injection in station 1. The soap then will coat the sticky plastic of the bristles during ejection. In the use of the brush, the bristles are simply dipped into water and the soap film will dissolve to produce a ready foam.

I claim:
1. A method of operating a two-shot injection-molding machine to produce composite articles each having one part of a relatively flexible modified rubber with a tendency to cling to a mold cavity during an extended hardening period and further having another part of a relatively rigid and more rapidly hardening plastic material adjoining said one part, comprising the steps of:
 (a) injecting said modified rubber into a first cavity formed at one station of the machine between a primary mold portion and a secondary mold portion juxtaposed with each other, thereby producing a first workpiece section;
 (b) retaining said first workpiece section on said primary mold portion while removing said secondary mold portion therefrom to expose a major surface of said first workpiece section while letting same cool;
 (c) juxtaposing a tertiary mold portion at another station of the machine with said primary mold portion to form a second cavity bounded by said major surface of the first workpiece section;
 (d) injecting said relatively rigid plastic material into said second cavity to produce a second workpiece section adhering to said first workpiece section along said major surface;
 (e) allowing said second workpiece section to cool with further cooling of said first workpiece section;
 (f) thereafter separating said tertiary mold portion from said primary mold portion; and
 (g) gradually pulling said second workpiece section away from said primary mold portion at a controlled rate slow enough to maintain the coherence of the entire workpiece.

2. A method as defined in claim 1 wherein step (g) is accompanied by a gradual separation of two members of said primary mold portion jointly defining part of said first cavity for partly detaching said first workpiece section from the corresponding cavity walls.

3. A method as defined in claim 1 or 2 wherein step (g) is performed concurrently with step (f) with retention of the workpiece on said tertiary mold portion, followed by a dislodgment of said workpiece from said tertiary mold portion.

4. A method as defined in claim 1 or 2 wherein step (g) is performed after a further cooling period following separation of said tertiary mold portion from said primary mold portion in step (f).

5. A method of operating a two-shot injection-molding machine to produce composite brushes each having a set of bristles of a relatively flexible modified rubber with a tendency to cling to a mold cavity during an extended hardening period and further having a handle of a relatively rigid and more rapidly hardening plastic material joined to said set of bristles, comprising the steps of:
  (a) injecting said modified rubber into a first cavity formed at one station of the machine between a primary mold portion and a secondary mold portion juxtaposed with each other, said first cavity including a multiplicity of elongate cells in said primary mold portion and an adjoining clearance in said secondary mold portion to produce a set of bristles integral with a common backing layer;
  (b) retaining said bristles in said cells on said primary mold portion while removing said secondary mold portion therefrom to expose a major surface of said backing layer while letting same cool together with said bristles;
  (c) juxtaposing a tertiary mold portion at another station of the machine with said primary mold portion to form a second cavity bounded by said major surface of the backing layer;
  (d) injecting said relatively rigid plastic material into said second cavity to produce a handle adhering to said backing layer along said major surface;
  (e) allowing said handle to cool with further cooling of said backing layer and said bristles;
  (f) thereafter separating said tertiary mold portion from said primary mold portion; and
  (g) gradually pulling said handle away from said primary mold portion at a controlled rate slow enough to maintain the coherence of the entire brush so molded.

6. A method as defined in claim 5 wherein step (g) is accompanied by a gradual separation of two members of said primary mold portion jointly defining said cells for partly detaching said bristles from the cell walls.

7. A method as defined in claim 5 or 6 wherein step (g) is performed concurrently with step (f) with retention of the brush on said tertiary mold portion, followed by a dislodgment of the brush from said tertiary mold portion.

8. A method as defined in claim 5 or 6 wherein step (g) is performed after a further cooling period following separation of said tertiary mold portion from said primary mold portion in step (f).

9. A method of operating a two-shot injection-molding machine to produce composite articles each having one part of a relatively flexible modified rubber with a tendency to cling to a mold cavity during an extended hardening period and further having another part of a relatively rigid and more rapidly hardening plastic material adjoining said one part, the machine being provided with a multi-sided turret sequentially rotatable through a plurality of angular positions between two platens which are relatively displaceable in each turret position within a respective molding cycle between a mold-open position and a mold-closed position, comprising the steps of:
  (a) injecting said modified rubber into a first cavity formed in a first angular turret position between a primary mold portion on a side of said turret and a secondary mold portion on one of said platens juxtaposed therewith in a mold-closed position of a first molding cycle thereby producing a first workpiece section;
  (b) retaining said first workpiece section on said primary mold portion while removing said secondary mold portion therefrom in a mold-opening stroke of said first molding cycle to expose a major surface of said first workpiece section;
  (c) letting said first workpiece section cool in a second angular turret position during a second molding cycle concurrently with a duplication of steps (a) and (b) on another turret side;
  (d) juxtaposing a tertiary mold portion on the other of said platens in a mold-closed position of a third molding cycle with said primary mold portion in a third angular turret position to form a second cavity bounded by said major surface of the first workpiece section;
  (e) injecting said relatively rigid plastic material into said second cavity to produce a second workpiece section, adhering to said first workpiece section along said major surface, during the third molding cycle concurrently with a duplication of steps (a) and (b) on a further turret side;
  (f) allowing said second workpiece section to cool with further cooling of said first workpiece section;
  (g) thereafter separating said tertiary mold portion from said primary mold portion in a mold-opening stroke of said third molding cycle; and
  (h) gradually pulling said second workpiece section away from said primary mold portion at a controlled rate slow enough to maintain the coherence of the entire workpiece.

10. A method as defined in claim 9 wherein step (h) is accompanied by a gradual separation of two members of said primary mold portion jointly defining part of said first cavity for partly detaching said first workpiece section from the corresponding cavity walls.

11. A method as defined in claim 9 or 10 wherein step (h) is performed in said third angular turret position concurrently with step (g) with retention of the workpiece on said tertiary mold portion, followed by a dislodgment of said workpiece from said tertiary mold portion during said third molding cycle.

12. A method as defined in claim 9 or 10 wherein step (h) is performed in a fourth angular turret position concurrently with a duplication of steps (a) and (b) on an additional turret side.

13. A method of operating a two-shot injection-molding machine to produce composite brushes each having a set of bristles of a relatively flexible modified rubber with a tendency to cling to a mold cavity during an extended hardening period and further having a handle of a relatively rigid and more rapidly hardening plastic material joined to said set of bristles, the machine being provided with a multi-sided turret sequentially rotatable through a plurality of angular positions between two platens which are relatively displaceable in each turret position within a respective molding cycle between a mold-open position and a mold-closed position, comprising the steps of:
  (a) injecting said modified rubber into a first cavity formed in a first angular turret position between a primary mold portion on a side of said turret and a secondary mold portion on one of said platens juxtaposed therewith in a mold-closed position of a first molding cycle, said first cavity including a multiplicity of elongate cells in said primary mold portion and an adjoining clearance in said secondary mold portion to produce a set of bristles integral with a common backing layer;

(b) retaining said bristles in said cells on said primary mold portion while removing said secondary mold portion therefrom in a mold-opening stroke of said first molding cycle to expose a major surface of said backing layer;

(c) letting said bristles and said backing layer cool in a second angular turret position during a second molding cycle concurrently with a duplication of steps (a) and (b) on another turret side;

(d) juxtaposing a tertiary mold portion on the other of said platens in a mold-closed position of a third molding cycle with said primary mold portion in a third angular turret position to form a second cavity bounded by said major surface of the backing layer;

(e) injecting said relatively rigid plastic material into said second cavity to produce a handle, adhering to said backing layer along said major surface, during the third molding cycle concurrently with a duplication of steps (a) and (b) on a further turret side;

(f) allowing said handle to cool with further cooling of said backing layer and bristles;

(g) thereafter separating said tertiary mold portion from said primary mold portion in a mold-opening stroke of said third molding cycle; and (h) gradually pulling said handle away from said primary mold portion at a controlled rate slow enough to maintain the coherence of the entire brush so molded.

14. A method as defined in claim 13 wherein step (h) is accompanied by a gradual separation of two members of said primary mold portion jointly defining said cells for partly detaching said bristles from the cell walls.

15. A method as defined in claim 13 or 14 wherein step (h) is performed in a fourth angular turret position concurrently with a duplication of steps (a) and (b) on an additional turret side.

16. A method as defined in claim 13 or 14 wherein step (h) is performed in said third angular turret position concurrently with step (g) with retention of the brush on said tertiary mold portion, followed by a dislodgment of the brush from said tertiary mold portion during said third molding cycle.

17. A method as defined in claim 16 wherein step (h) is performed during a significant fraction of a molding cycle.

18. A method as defined in claim 17 wherein the duration of a molding cycle is substantially 20 seconds, step (h) being performed in substantially 3 seconds.

* * * * *